United States Patent Office 3,222,389
Patented Dec. 7, 1965

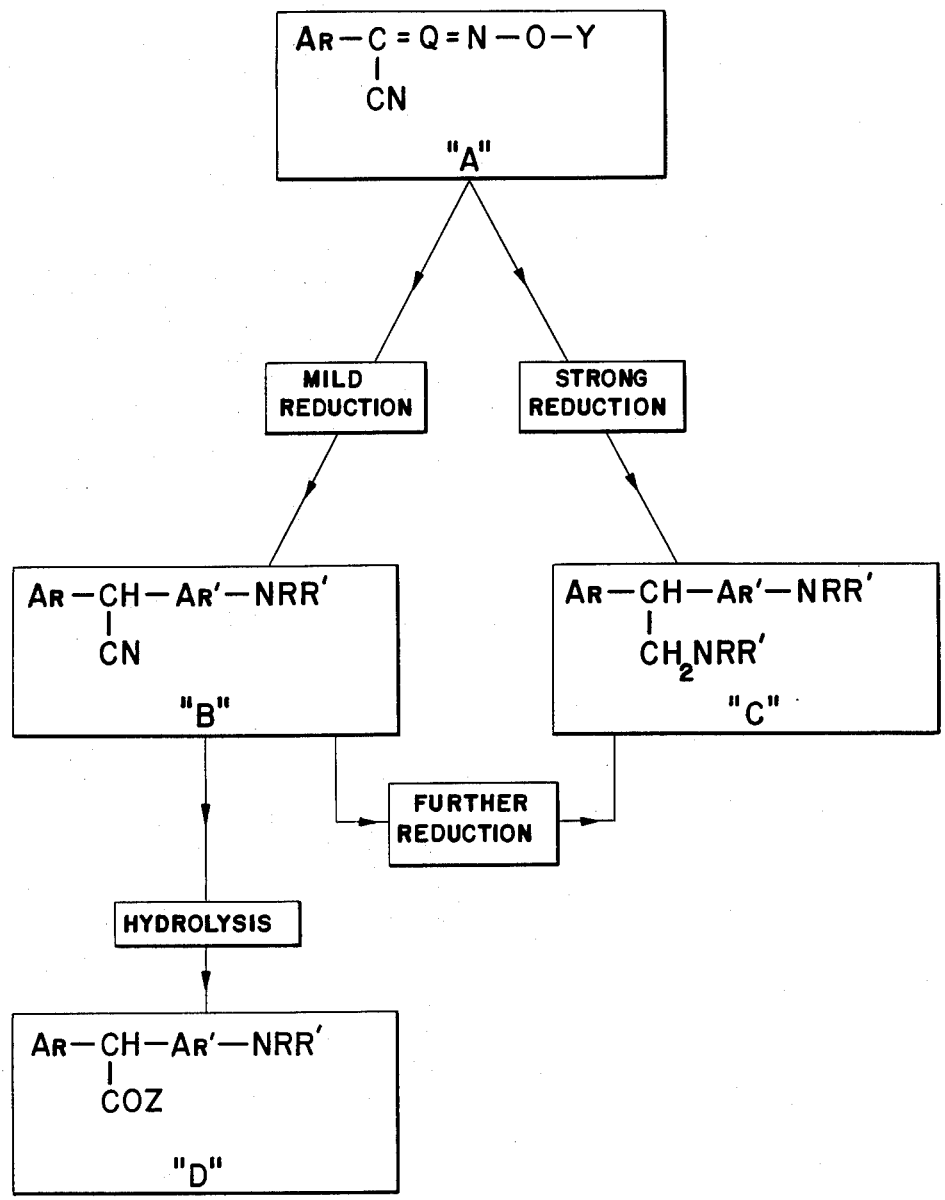

3,222,389
PHENYL-p-AMINOPHENYL ACETONITRILE COMPOUNDS AND SUBSTITUTED DERIVATIVES THEREOF
Ralph B. Davis, Notre Dame, Ind., assignor to University of Notre Dame, Notre Dame, Ind.
Filed Sept. 23, 1964, Ser. No. 398,704
7 Claims. (Cl. 260—465)

This invention relates to new aromatic amines and derivatives thereof. It also relates to the methods for the preparation of these new compounds. This application is a continuation-in-part application of copending application Serial No. 87,569, filed February 7, 1961, now abandoned.

The new compounds of this application can be represented by the following formula:

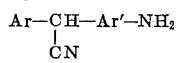

$$\text{Ar}-\underset{\underset{\text{CN}}{|}}{\text{CH}}-\text{Ar}'-\text{NH}_2$$

wherein Ar is a phenyl or naphthyl radical, or a derivative thereof having one or two substitutent groups thereon; Ar' is a 1,4-phenylene or 1,4-naphthylene radical, or a derivative thereof having one or two substituent groups thereon, the substituent groups on said Ar and Ar' radicals being selected from the class consisting of —Cl, —Br, —I, —R, and —OR, wherein R is an aliphatic or aromatic hydrocarbon group. No particular advantage is derived by having more than about twenty carbon atoms in any R group in the compounds of this invention and generally it is preferred that such a group be a saturated aliphatic hydrocarbon radical having no more than about five carbon atoms therein. Likewise it is sometimes preferred that Ar represent a p-chlorophenyl, p-methoxyphenyl or 1-naphthyl group.

In accordance with the process of this invention these compounds can be prepared by the reduction of quinoid compounds having the formula:

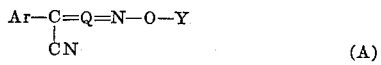

$$\text{Ar}-\underset{\underset{\text{CN}}{|}}{\text{C}}=\text{Q}=\text{N}-\text{O}-\text{Y} \quad (A)$$

disclosed and claimed in applicant's copending application, Serial No. 21,622, filed April 12, 1960, now Patent No. 3,156,704 wherein Ar is an aromatic group as defined above, Q is a 1,4-quinoid group, and Y is a group selected from hydrogen, potassium, and sodium.

The process of this invention is illustrated by the accompanying flow sheet drawing. When the quinoid structure of the above formula A is reduced under mild conditions, e.g., without reduction of the nitrile group, the new compound B retains the original —CN. When the nitrile group is reduced simultaneously, e.g., by the use of strong reducing conditions, the new compound C has the —CN replaced by —CH₂NRR' as disclosed and claimed in applicant's copending application, Serial No. 401,757, filed the same date herewith. When the cyano group is not reduced, but is hydrolyzed, solvolyzed or otherwise converted to an acid derivative group, the new compound D has the —CN replaced by —COZ.

In the compounds of this invention the aromatic radicals Ar and Ar' can be unsubstituted, but substituent groups can also be present on these aromatic nuclei, particularly where special modified properties are desired, including but not restricted to: —Cl, —Br, —I, —R such as methyl, ethyl, propyl, isopropyl, butyl, isobutyl, secondary butyl, amyl, isoamyl, hexyl, octyl, decyl, cyclopentyl, cyclohexyl, phenyl, tolyl, naphthyl, benzyl, phenylethyl, methylnaphthyl, etc., and —OR such as methoxy, ethoxy, propoxy, isopropoxy, butoxy, isobutoxy, secondary butoxy, pentoxy, phenoxy, naphthoxy, etc.

Illustrative examples of the monovalent groups represented by Ar in the above formula include, but are not restricted to: —C₆H₅, —C₆H₄Cl, —C₆H₄Br, —C₆H₄I, —C₆H₃Cl₂, —C₆H₄OCH₃, —C₆H₄OC₂H₅, —C₆H₄CH₃, —C₆H₄C₂H₅, —C₆H₄C₃H₇, —C₆H₃(CH₃)₂, —C₆H₃Cl(CH₃)

—C₁₀H₇, —C₁₀H₆Cl, —C₁₀H₅Cl₂, —C₁₀H₆CH₃,

—C₁₀H₆OCH₃ etc.

Illustrative examples of the 1,4-bivalent groups represented by Ar' in the above formula include, but are not restricted to the following 1,4-radicals: —C₆H₄—, —C₆H₃Cl—, —C₆H₃Br—, —C₆H₃I—, —C₆H₂Cl₂—, —C₆H₃OCH₃—, —C₆H₃OC₂H₅—, —C₆H₃CH₃—,

—C₆H₃C₂H₅—

—C₆H₃C₃H₇—, —C₆H₂(CH₃)₂—, —C₆H₂(OCH₃)₂—, —C₆H₂Cl(OCH₃)—, —C₆H₂Cl(CH₃)—, —C₁₀H₆—, —C₁₀H₅Cl—, C₁₀H₅Br—, —C₁₀H₅CH₃—,

—C₁₀H₅OCH₃— etc.

The chemical compounds of this invention have broad applications and can be used specifically as anti-oxidants. They have application in inter-facial agents, for example, emulsifying agents, detergents and suspension agents, and as complexing agents for metals. These new compounds are likewise useful in the production of dyes and resins. Furthermore, many of them can be used as chemical intermediates for the syntheses of drugs, insecticides, agricultural chemicals, plasticizers, polymer stabilizers, curing catalysts for convertible resins, and other useful purposes. The primary amine group in the compounds of this invention makes them useful for many purposes, such as in the preparation of azo dyes, incorporation in and modification of epoxy resins, etc. For example, an azo dye is produced by diazotizing phenyl-p-aminophenylacetonitrile, followed by coupling with 2-naphthol.

An unexpected property of the compounds of this invention is their ability to form polyamidine resins, which have application in films, fibers, coatings, etc. The ordinary primary aromatic amines and the di-alkylated aromatic amines do not have this property, and hence it is unexpected that the compounds of this invention would form such polymers since they are essentially primary aromatic amines.

The formation and structure of the polyamidine resins can be represented by the following equation:

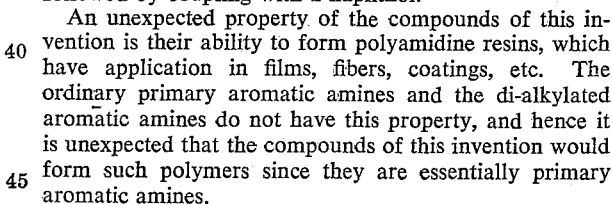

A wide variety of chemical and catalytic methods can be employed to accomplish the reduction of the quinoid compounds A. However, to produce the amino-nitrile compounds of this invention, mild reducing conditions are employed. For mild chemical reduction to the amino-nitriles, I prefer to treat the quinoid compounds with at least an equivalent amount of zinc or amalgamated zinc and acetic acid in the presence of suitable diluents such as methanol or methanol-water at temperatures ranging from about 50° C. to about 70° C. For mild catalytic reduction to the amino-nitriles, I prefer to treat the quinoid compounds with hydrogen in the presence of Raney nickel and a suitable diluent such as methanol, ethanol, etc., at a pressure of about 1000 lbs. per square inch at about room temperature.

Illustrative examples of the quinoid compounds that can be employed in the above reductions include, but are not restricted to the following:

$C_6H_5C(CN)=C_6H_4=NOH$,
$C_6H_5C(CN)=C_6H_4=NONa$,
$C_6H_5C(CN)=C_6H_4=NOK$,
$ClC_6H_4C(CN)=C_6H_4=NOH$,
$BrC_6H_4C(CN)=C_6H_4=NOH$,
$IC_6H_4C(CN)=C_6H_4=NOH$,
$CH_3OC_6H_4C(CN)=C_6H_4=NOH$,
$CH_3OC_6H_4C(CN)=C_6H_4=NOK$,
$C_6H_5C(CN)=C_6H_3(CH_3)=NOH$,
$ClC_6H_4C(CN)=C_6H_3(CH_3)=NOH$,
$CH_3OC_6H_4C(CN)=C_6H_3(CH_3)=NOH$,
$C_6H_5C(CN)=C_6H_3(Cl)=NOH$,
$ClC_6H_4C(CN)=C_6H_3(Cl)=NOH$,
$CH_3OC_6H_4C(CN)=C_6H_3(Cl)=NOH$,
$C_6H_5C(CN)=C_6H_3(OCH_3)=NOH$,
$ClC_6H_4C(CN)=C_6H_3(OCH_3)=NOH$,
$CH_3OC_6H_4C(CN)=C_6H_3(OCH_3)=NOH$,
$C_6H_5C(CN)=C_6H_2(Cl)(CH_3)=NOH$,
$ClC_6H_4C(CN)=C_6H_2(Cl)(CH_3)=NOH$,
$CH_3OC_6H_4C(CN)=C_6H_2(Cl)(CH_3)=NOH$,
$C_6H_5C(CN)=C_6H_2(CH_3)_2=NOH$,
$ClC_6H_4C(CN)=C_6H_2(CH_3)_2=NOH$,
$CH_3OC_6H_4C(CN)=C_6H_2(CH_3)_2=NOH$,
$C_6H_5C(CN)=C_6H_2(OCH_3)_2=NOH$,
$ClC_6H_4C(CN)=C_6H_2(OCH_3)_2=NOH$,
$CH_3OC_6H_4C(CN)=C_6H_2(OCH_3)_2=NOH$,
$C_6H_5C(CN)=C_6H_2(Cl)_2=NOH$,
$ClC_6H_4C(CN)=C_6H_2(Cl_2)=NOH$,
$CH_3OC_6H_4C(CN)=C_6H_2(Cl)_2=NOH$,
$C_6H_5C(CN)=C_6H_2(Cl)(OCH_3)=NOH$,
$ClC_6H_4C(CN)=C_6H_2(Cl)(OCH_3)=NOH$,
$CH_3OC_6H_4C(CN)=C_6H_2(Cl)(OCH_3)=NOH$,
$C_{10}H_7C(CN)=C_6H_4=NOH$,
$C_{10}H_7C(CN)=C_6H_3(OCH_3)=NOH$,
$C_{10}H_7C(CN)=C_6H_3(Cl)=NOH$,
$C_{10}H_7C(CN)=C_6H_3(CH_3)=NOH$,
$C_6H_5C(CN)=C_{10}H_6=NOH$,
$ClC_6H_4C(CN)=C_{10}H_6=NOH$,
$CH_3OC_6H_4C(CN)=C_{10}H_6=NOH$, etc.

Illustrative examples of the amino-nitriles that can be prepared according to the above procedures include, but are not restricted to the following:

$C_6H_5CH(CN)C_6H_4—NH_2$, $ClC_6H_4CH(CN)C_6H_4—NH_2$,
$BrC_6H_4CH(CN)C_6H_4—NH_2$,
$IC_6H_4CH(CN)C_6H_4—NH_2$,
$CH_3OC_6H_4CH(CN)C_6H_4—NH_2$,
$C_2H_5OC_6H_4CH(CN)C_6H_4—NH_2$,
$CH_3C_6H_4CH(CN)C_6H_4—NH_2$,
$Cl(CH_3)C_6H_3CH(CN)C_6H_4—NH_2$,
$Cl_2C_6H_3CH(CN)C_6H_4—NH_2$,
$C_6H_5CH(CN)C_6H_3(Cl)—NH_2$,
$C_6H_5CH(CN)C_6H_3(Br)—NH_2$,
$C_6H_5CH(CN)C_6H_3(I)—NH_2$,
$C_6H_5CH(CN)C_6H_3(OCH_3)—NH_2$,
$C_6H_5CH(CN)C_6H_3(OC_2H_5)—NH_2$,
$C_6H_5CH(CN)C_6H_3(CH_3)—NH_2$,
$C_6H_5CH(CN)C_6H_3(C_2H_5)—NH_2$,
$C_6H_5CH(CN)C_6H_2(Cl_2)—NH_2$,
$C_6H_5CH(CN)C_6H_2(Cl)(CH_3)—NH_2$,
$C_6H_5CH(CN)C_6H_2(OCH_3)_2—NH_2$,
$CH_3OC_6H_4CH(CN)C_6H_3(Cl)—NH_2$,
$ClC_6H_4CH(CN)C_6H_2(Cl)(CH_3)—NH_2$,
$C_{10}H_7CH(CN)C_6H_4—NH_2$,
$C_6H_5CH(CN)C_{10}H_6—NH_2$, etc.

In order to demonstrate various modifications in the manner in which this invention can be practiced, the following examples are given by way of illustration and not by way of limitation. Parts and percentages are parts and percentages by weight, unless otherwise indicated.

*Example 1*

To a reaction vessel containing 60 parts of phenylcyanomethylene quinone oxime, 500 parts of methanol and 60 parts of amalgamated zinc dust, is added in increments over one hour with stirring and cooling, 160 parts of acetic acid. The reaction mixture is then cautiously heated to reflux, and reflux and stirring are maintained for five hours. During this period, 20 parts of amalgamated zinc dust and 40 parts of water are added in increments. The reaction mixture is cooled, filtered, and 1500 parts of water is added with stirring to the filtrate. The phenyl-p-aminophenylacetonitrile which settles to the bottom of the mixture is removed, washed with water, and after drying melts at 68–70° C. (99% yield). Upon recrystallization from benzene-petroleum ether (B.P. 61–70° C.), the product melts at 72° C.

*Example 2*

The procedure of Example 1 is repeated using an equivalent amount of 2-methyl-4-(phenylcyanomethylene) cyclohexa-2,5-diene-1-one oxime in place of phenylcyanomethylene quinone oxime and there is obtained phenyl-(3-methyl-4-aminophenyl)acetonitrile (M.P. 108° C.) (96% yield).

*Example 3*

The procedure of Example 1 is repeated using an equivalent amount of 2-chloro-4-(phenylcyanomethylene)-cyclohexa-2,5-diene-1-one oxime in place of phenylcyanomethylene quinone oxime, and there is obtained phenyl-(3-chloro-4-aminophenyl)acetonitrile (M.P. 72–74° C., 96% yield).

*Example 4*

The procedure of Example 1 is repeated using an equivalent amount of 4-(p-chlorophenylcyanomethylene)-cyclohexa-2,5-diene-1-one oxime in place of phenylcyanomethylene quinone oxime, and there is obtained p-chlorophenyl-p-aminophenylacetonitrile (M.P. 73° C., 88% yield).

*Example 5*

The procedure of Example 1 is repeated using an equivalent amount of 4-(p-methoxyphenylcyanomethylene)-cyclohexa 2,5-diene-1-one oxime in place of phenylcyanomethylene quinone oxime, and there is obtained p-methoxyphenyl-p-aminophenyl-acetonitrile (M.P. 135° C., 87% yield).

*Example 6*

The procedure of Example 1 is repeated using an equivalent amount of 2-methoxy-4-(phenylcyanomethylene)-cyclohexa-2,5-diene-1-one oxime in place of phenylcyanomethylene quinone oxime, and there is obtained phenyl-(3-methoxy-4-aminophenyl)acetonitrile (M.P. 53° C., 95% yield).

*Example 7*

The procedure of Example 1 is repeated using an equivalent amount of 3-chloro-4-(phenylcyanomethylene)-cyclohexa-2,5-diene-1-one oxime in place of the phenylcyanomethylene quinone oxime, and there is obtained phenyl-)4-amino-2-chlorophenyl)-acetonitrile (M.P. 97–99° C., 96% yield).

*Example 8*

The procedure of Example 1 is repeated using an equivalent amount of 3-methyl-4-(phenylcyanomethylene)-cyclohexa-2,5-diene-1-one oxime in place of the phenylcyanomethylene quinone oxime, and there is obtained phenyl-(4-amino-2-methylphenyl)-acetonitrile (M.P. 142° C., 93% yield).

*Example 9*

The procedure of Example 1 is repeated using an equivalent amount of 2-bromo-4-(phenylcyanomethylene)-cyclohexa-2,5-diene-1-one oxime in place of the phenylcyanomethylene quinone oxime, and there is obtained phenyl-(4-amino-3-bromophenyl)-acetonitrile (M.P. 78° C., 94% yield).

*Example 10*

The procedure of Example 1 is repeated using an equivalent amount of 2,5-dichloro-4-(phenylcyanomethylene)-cyclohexa-2,5-diene-1-one oxime, and there is obtained phenyl-(4-amino-2,5-dichlorophenyl)-acetonitrile, (M.P. 132–134° C., 99% yield).

*Example 11*

The procedure of Example 1 is repeated using an equivalent amount of 2,3-dichloro-4-(phenylcyanomethylene)-cyclohexa-2,5-diene-1-one oxime in place of the phenylcyanomethylene quinone oxime, and there is obtained phenyl-(4-amino-2,3-dichlorophenyl)-acetonitrile (M.P. 121–123° C., 80% yield).

*Example 12*

The procedure of Example 1 is repeated using an equivalent amount of α-naphthylcyanomethylene quinone oxime in place of the phenylcyanomethylene quinone oxime, and there is obtained (α-naphthyl)-(p-aminophenyl)-acetonitrile (which for purposes of purification is isolated as the hydrochloride salt in 76% yield).

*Example 13*

The procedure of Example 1 is repeated using an equivalent amount of 4-(phenylcyanomethylene)-naphthoquinone-1 oxime in place of the phenylcyanomethylene quinone oxime, and there is obtained phenyl-(4-aminonaphthyl)-acetonitrile (which for purposes of purification is isolated as the hydrochloride salt in 72% yield).

*Example 14*

An autoclave is charged with 10 parts of phenylcyanomethylene quinone oxime, 100 parts methanol, 2 parts of a slurry of Raney nickel in water and hydrogen under a pressure of 900 lbs. per square inch. The reaction mixture is shaken at room temperature for two hours, the pressure is then released and the mixture is filtered. Upon removal of the methanol from the filtrate, there is obtained phenyl-p-aminophenylacetonitrile (89% yield).

When the potassium salt of phenylcyanomethylene quinone oxime and the sodium salt of phenylcyanomethylene quinone oxime respectively are used in place of the phenylcyanomethylene quinone oxime in the above procedure, the same product is obtained.

*Example 15*

The procedure of Example 14 is repeated using an equivalent amount of 2-methyl-4-(phenylcyanomethylene)-cyclohexa-2,5-diene-1-one oxime in place of the phenylcyanomethylene quinone oxime, and there is obtained phenyl-(3-methyl-4-aminophenyl)-acetonitrile (85% yield).

*Example 16*

The procedure of Example 14 is repeated using an equivalent amount of p-chlorophenylcyanomethylene quinone oxime in place of the phenylcyanomethylene quinone oxime, and there is obtained p-chlorophenyl-p-aminophenylacetonitrile (88% yield).

*Example 17*

The procedure of Example 14 is repeated using an equivalent amount of 2-chloro-4-(p-chlorophenylcyanomethylene)-cyclohexa-2,5-diene-1-one oxime in place of the phenylcyanomethylene quinone oxime, and there is obtained p-chlorophenyl(4-amino-3-chlorophenyl)-acetonitrile (M.P. 102–104° C., 87% yield).

The invention claimed is:
1. An aromatic amine compound having the formula

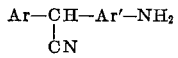

wherein Ar is a monovalent radical selected from the class consisting of phenyl and naphthyl and derivatives thereof having no more than two substituent groups thereon; Ar′ is a divalent radical selected from the class consisting of 1,4-phenyl and 1,4-naphthylene and derivatives thereof having no more than two substituent groups thereon: each of said substituent groups on said Ar and Ar′ radicals being selected only from the class consisting of —Cl, —Br, —I, —R, and OR, wherein R is a saturated aliphatic hydrocarbon group having no more than five carbon atoms therein.
2. Phenyl-p-aminophenylacetonitrile.
3. Phenyl(3-chloro-4-aminophenyl)-acetonitrile.
4. Phenyl-(3-methyl-4-aminophenyl)-acetonitrile.
5. Phenyl-(3-methoxy-4-aminophenyl)-acetonitrile.
6. p-Chlorophenyl-p-aminophenylacetonitrile.
7. p-Methoxyphenyl-p-aminophenylacetonitrile.

No references cited.

CHARLES B. PARKER, *Primary Examiner.*